April 17, 1934.  H. HAVERKORT  1,954,933
MACHINE FOR CUTTING, RAISING, CONVEYING, AND DEPOSITING PEAT SODS
Filed Dec. 7, 1932  5 Sheets-Sheet 1
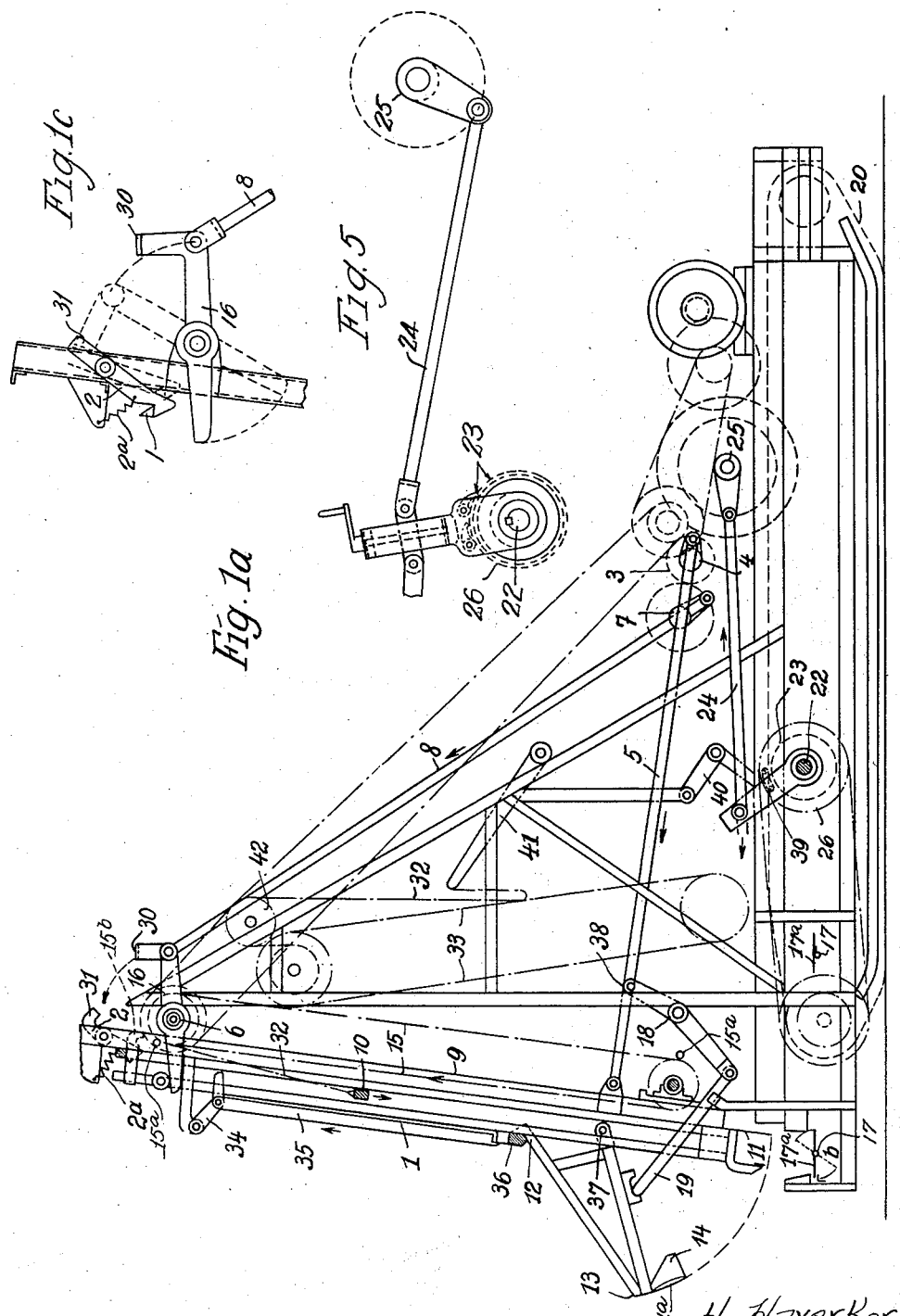

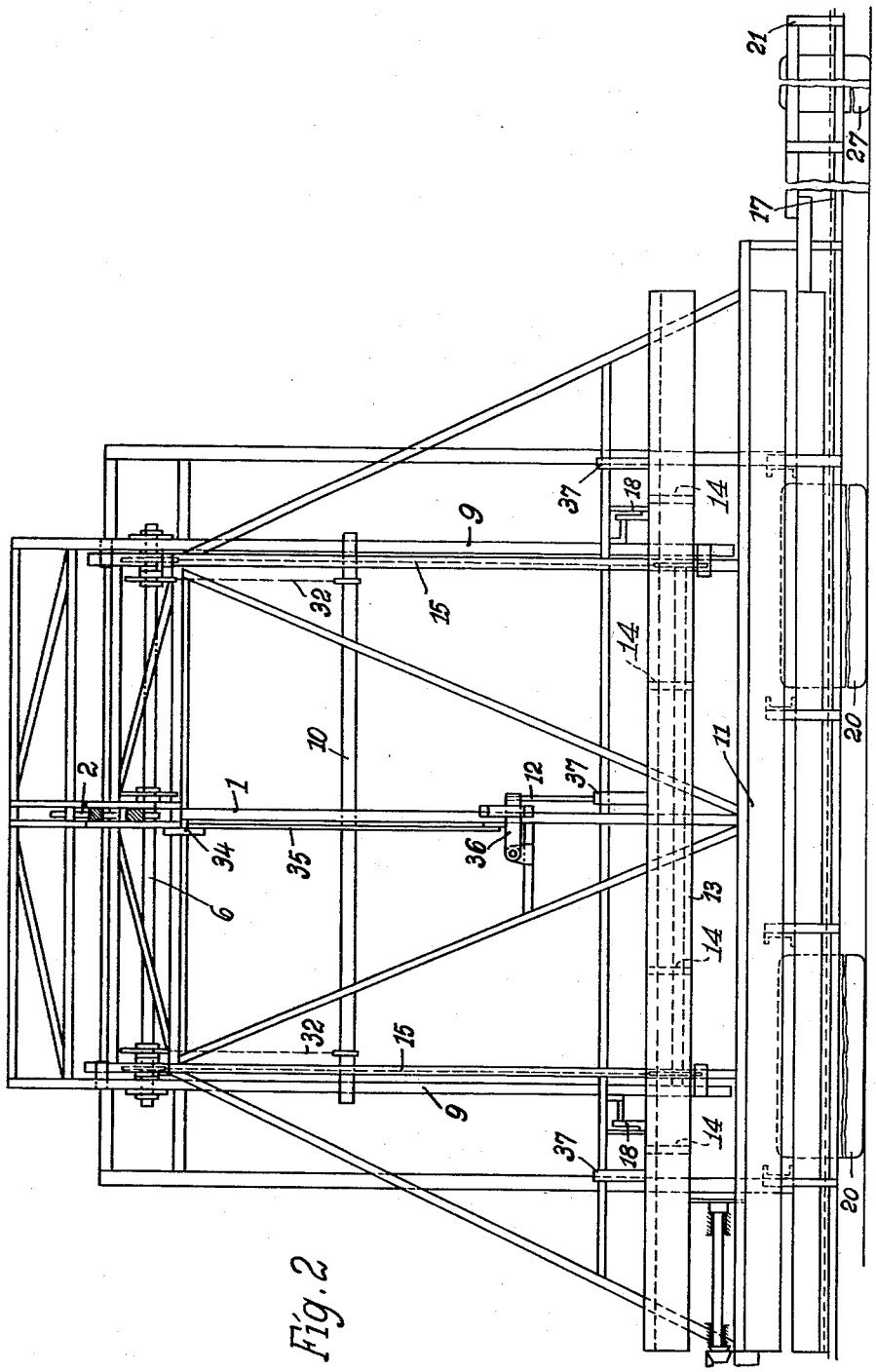

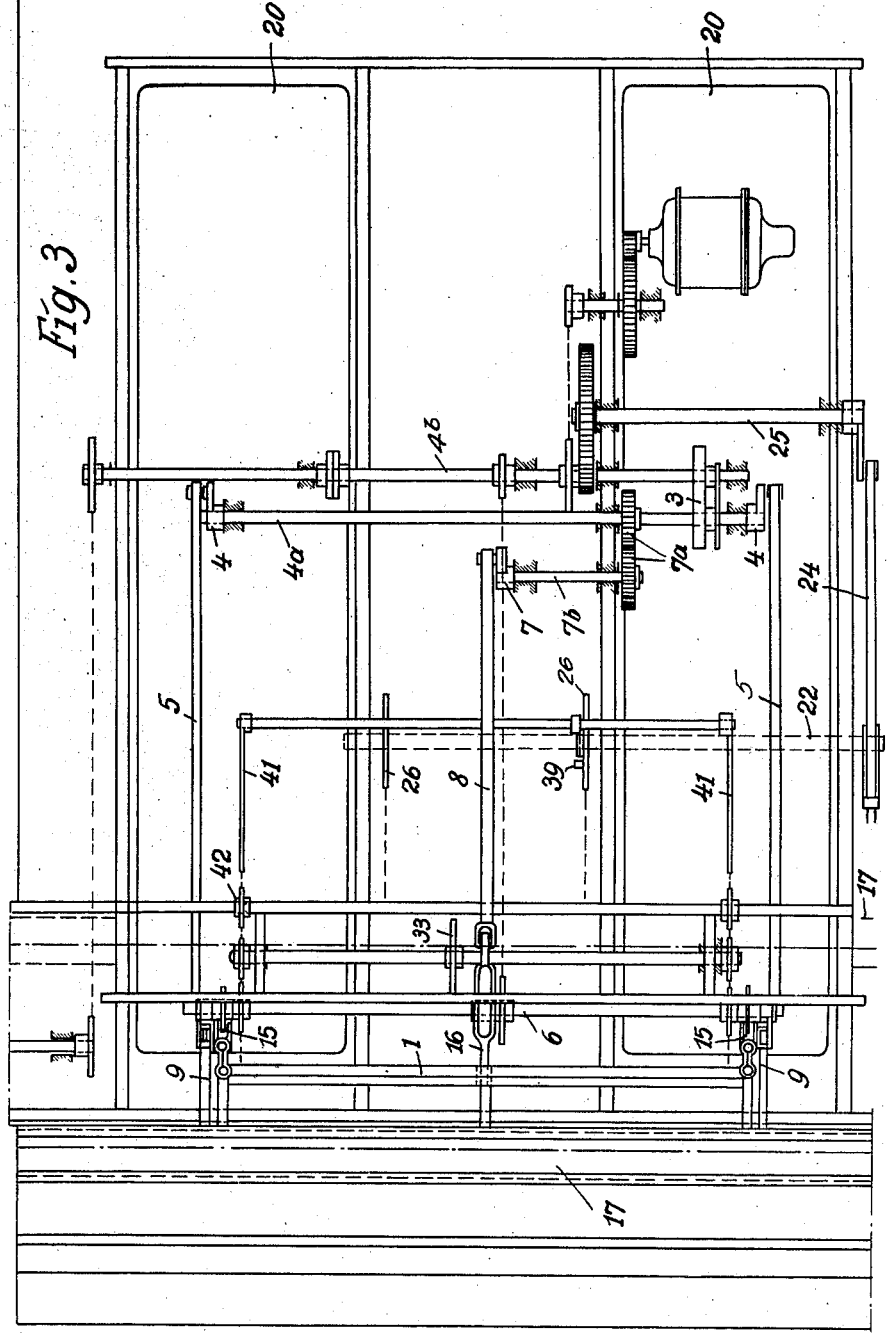

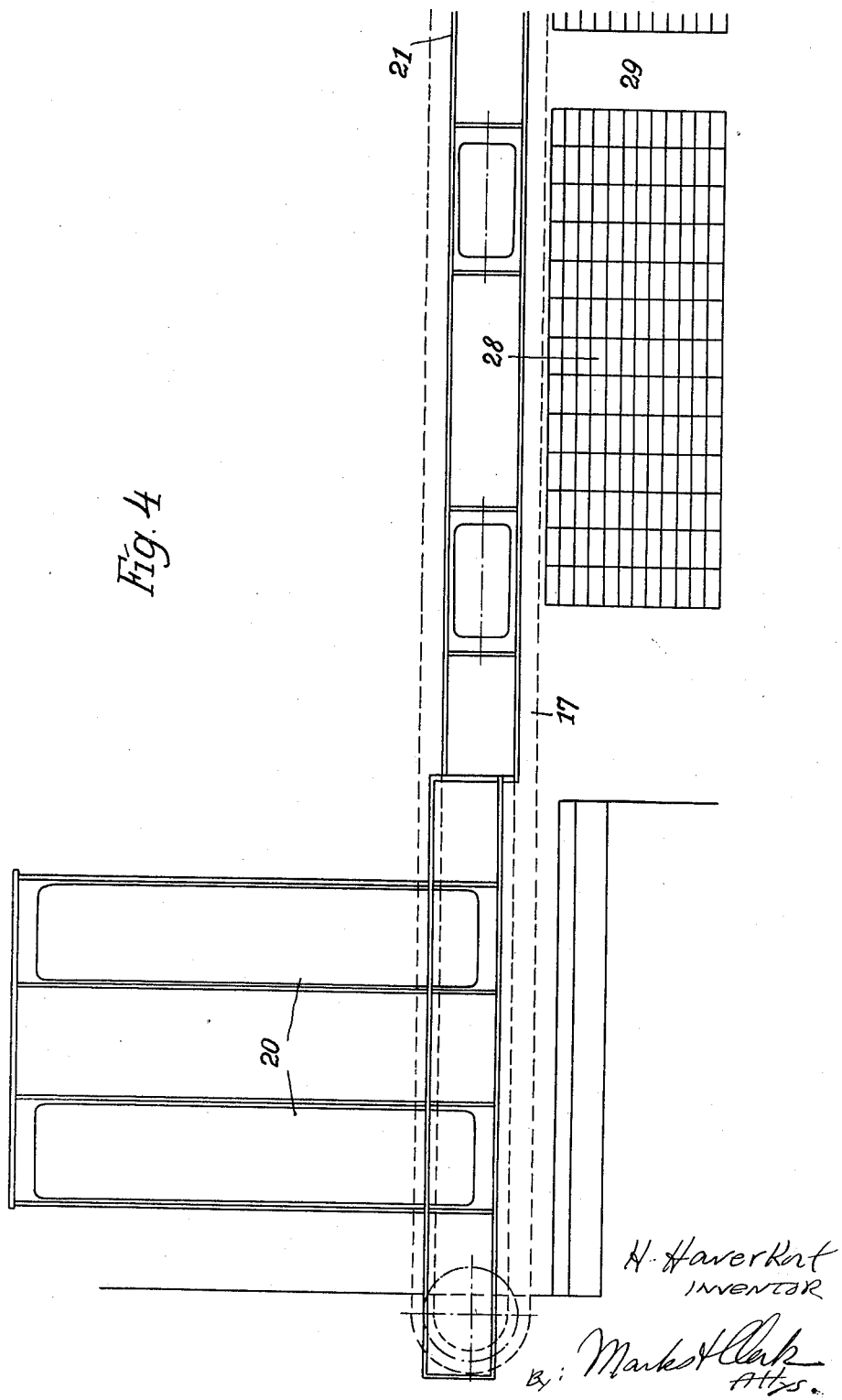

Patented Apr. 17, 1934

1,954,933

UNITED STATES PATENT OFFICE 1,954,933

MACHINE FOR CUTTING, RAISING, CONVEYING, AND DEPOSITING PEAT SODS

Hendrik Haverkort, Velen in Westphalia, Germany, assignor to Heseper Torfwerk Gesellschaft mit beschränkter Haftung, Meppen, Germany Application December 7, 1932, Serial No. 646,186
In Germany September 12, 1931

12 Claims. (Cl. 37—3)

Machines for cutting, raising, conveying and depositing peat sods are known. These have, however, various defects; in particular, they effect the various working operations upon a plurality of individual machines and by employing a comparatively large number of labourers. Furthermore the cut in the bog with all the known machines is so narrow that the quantity of peat obtained cannot be erected into a continuous storage heap which will be unaffected by weather conditions. A large storage heap requires in fact a number of machines on the same cut.

According to this invention these disadvantages have been eliminated by executing all the working operations of the machine automatically without any manipulation by hand, only one supervisor being required. It permits of rapid work, and thereby attains large outputs. The cut in the bog may be so broad and so deep that the erection of the storage heaps can be effected continuously by means of already existing collecting and stacking machines.

The releasing of the cutting frame arranged at the rear of the machine, with the cutting knives for cutting out a strip of peat, and the releasing of the beating or dividing knife for the purpose of subdividing the strip of peat into the desired brick-like pieces of peat, are effected through the medium of a ratchet or feeding device, transmission members, cranks, pulling rods rocking levers with stops, pawls, and finally an abutment beam.

The depth of cutting is determined by a mechanically controlled abutment beam, which also serves at the same time as an abutment for the release of the pivoted carrier of the beating knife, which divides the strip of peat into sods.

The cutting frame is periodically raised and automatically held fast in the upper position by the aforementioned ratchet or feeding device, and then rocked inwards into a position above a belt conveyor, for the purpose of depositing the cut peat sods upon the belt conveyor. The rocking in and out of the cutting frame is also initiated by the ratchet or feeding mechanism, being brought about through the medium of a shaft, cranks and rods, which are pivoted to the cutting frame. When the cutting frame is rocked in to the working position above the belt conveyor, the beating or dividing knives are rocked up again, and at the same time the peat sods are liberated.

The adjusting of the abutment beam, which hangs from chains, is effected by means of a gear which runs continuously in one direction at a low speed, and round which the chain is passed. By this adjustment of the beam the depth of cutting is regulated. A ratchet or feeding mechanism is adjusted to the number of cuts, and this pulls back the chains supporting the abutment beam, through the medium of a slipping clutch for instance, after the desired cuts have been executed, for the purpose of commencing a fresh series of cuts. In the same interval of time the machine, with the peat sod depositor, is moved forwards, that is to say, away from the working face of the bog, by the same ratchet or feeding mechanism, through a distance equal to the breadth of one peat sod.

The depositor, during the time in which the desired cuts have been executed, has deposited the peat sods in a few superposed layers upon a catch mechanism, in such a way as to leave intervals at distances equal to the breadth of the cut. Before the machine is advanced the catch mechanism moves backwards and deposits the peat sods upon the drying field.

One example of the construction of the invention is illustrated in the accompanying drawings, in which Figure 1a shows the machine as seen from the side, the cutting frame being rocked into a position above the belt conveyor; while Figure 1b shows the machine likewise from the side, but with the cutting frame rocked into a position above the working face of the bog.

Fig. 1c is a fragmentary detail view of the retaining pawl for the cutting frame.

In Figure 2 the machine is shown as seen from the front; and in

Figure 3 as seen from above; while

Figure 4 illustrates in plan how the belt conveyor is advanced, and shows one example of how the peat sods can be deposited by the belt conveyor for drying.

Fig. 5 is a fragmentary detail view of the pawl and ratchet mechanism associated with the driving gear of the machine.

Figure 1B:
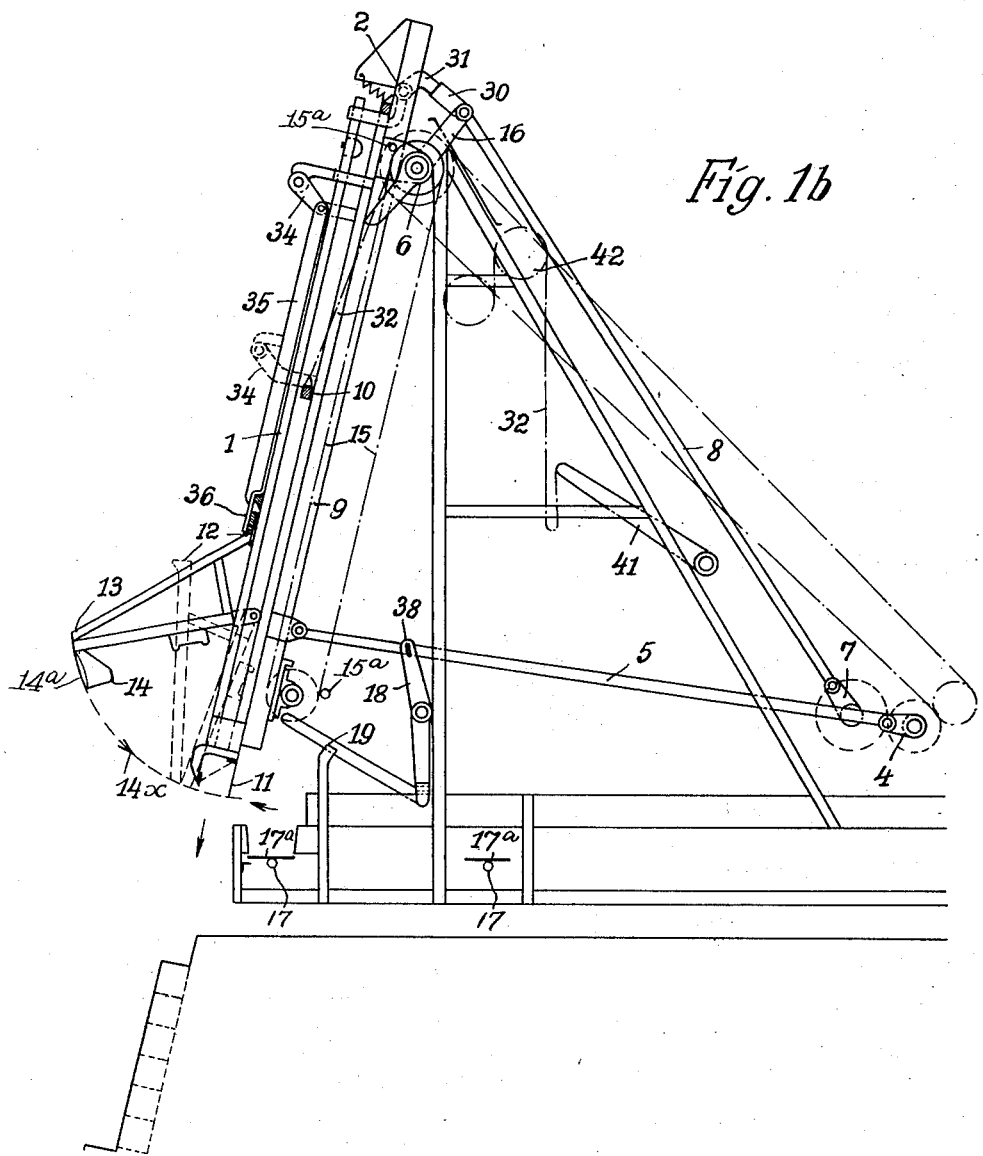

The machine is so constructed that it is capable of cutting strips of peat of the length of any selected bog cut up to 10 metres wide and up to 10 metres deep, which are subdivided into brick-shaped sods of any desired dimensions. These latter are put down for drying purposes in intervening spaces of any convenient length upon the drying field, as shown in Fig. 4. It is obvious that the invention is not limited to the dimensions here indicated.

The cutting frame 1 is held fast in its uppermost position by a pawl 2, provided with a tension spring 2a. By means of ratchet or feeding gear 3, in conjunction with two cranks 4 keyed to a shaft 4a, actuated from a motor-driven shaft 4b, and two connecting rods 5, the cutting frame 1, which is rockable about a driving shaft 6, is rocked into the position shown in Figure 1b above the layer of bog to be cut. When the cutting frame 1 has reached the desired cutting position, the pawl 2 is released by the gear 3 through the medium of the shaft 4a and other transmission members, such as spur wheels 7a, a shaft 7b, a crank 7 and a connecting rod 8, which rocks a double lever 16, about the shaft 6 and thereby moves an abutment 30 upwards in the direction of the arrow in Figure 1a, the nose 31 of the pawl 2 being pushed back by the abutment 30. The cutting frame 1, sliding in lateral guides 9, shown in Figs. 1a, 1b, 2 and 3, thereby drops freely, and the cutter 11 extending along its bottom edge effects an approximately vertical cut in the bog. An abutment beam 10, which is automatically adjusted to correspond to the depth to be cut by means of a device hereinafter described, catches the cutting frame 1 in its fall and only permits the vertical knife 11 to penetrate into the bog to the depth desired. The abutment beam 10 is suspended by two chains 32, which are driven by suitable gearing 33, and which continue running a length of time corresponding to the desired depth of cut.

By the abutment beam 10, moreover, shortly before the cutting frame 1 reaches its lowest position, a pawl 12 on a knife-holder 13, carrying short exchangeable transverse knives 14 and a longitudinal bottom knife 14a, which strikes horizontally into the bog, is released, by a lever 34, mounted on the cutting frame 1, striking against the abutment beam 10 as the cutting frame 1 falls, and, by means of a connecting rod 35, releasing the locking bar 36, which until then had been retaining the knife-holder 13 in the deflected position illustrated. The knife-holder 13 which rocks about pivots 37 on the cutting frame 1, then swings downwards about these pivots in consequence of its intrinsic weight and of the momentum arising from its free fall, and the knives 14 then strike into the bog in the direction of the arrow 14x in Figure 1b, thereby dividing the strip of peat, now cleanly separated from the bog wall, into sods of the desired length. After the cutting of the peat sods, two continuously revolving chains 15, each provided with pins 15a engaging the hook like members 15b on the frame 1 move the latter in an upward direction. Before the cutting frame 1 has reached its highest position its ascent is accelerated by the double lever 16, so that the aforementioned cams on the chains 15, upon reaching the upper chain wheels, can run freely past the cutting frame. The double lever 16, to which the abutment 30 for the release of the pawl 2 is secured, is moved by the crank 7 and the connecting rod 8 at a speed greater than that at which the lifting chains 15 work. In its uppermost position the cutting frame 1 is held fast again by the pawl 2, which has been released by the abutment 30 and has sprung in owing to the resilience of the spring 2a, until the next cut takes place. Simultaneously with the accelerated raising of the cutting frame 1 by the double lever 16 and the latching of the same, the rocking of the cutting frame into a position above a belt conveyor 17 and the opening of the horizontally acting dividing knife 14, that is to say, the rocking away of the knife-holder 13, are effected by the gear 3, through the medium of the cranks 4 and connecting rods 5 and other elements. The strip of sods now falls on to the continuously revolving endless conveyor 17, to be conveyed by the latter to the drying ground. The retracting of the knife-holder 13 is effected by rods 19, which are pivotally connected at their rear with the lower ends of levers 18, which are moved by pins 38 on the connecting rod 5 engaging the upper arms of the said levers, and which swing the knife-holder 13 in an upward direction about its pivots 37. The locking bar 36 is raised by the pawl 12 and falls down again, after reaching the uppermost position, in front of the pawl 12, and holds fast the beating knife carrier 13 thereon until the next cut, when it is again released by the abutment beam 10.

Thereupon the operations hereinbefore described are repeated, and the next cut, which is deeper, is effected.

The working speed of the machine is determined by the speed of the two chains 15 provided with cams, and is the same for all depths of cut. In the case of the upper cuts, therefore, there is necessarily a longer pause between cutting and raising than in the case of the lower cuts.

The speed of the endless belt conveyor 17, consisting of a flat steel chain with plates 17a hingedly attached thereto, admits of being so adjusted that between the strips of sods 28 lying upon the chain plates, which may be anything up to 10 metres long according to the example given, any desired intervening spaces 29 (Fig. 4) are left, preferably corresponding to the breadth of the drying field. These spaces are necessary in order that it may be possible to walk about the drying ground without injuring the sods, and to enable the sods to be so stacked, for the purpose of rapid drying, that plenty of room is given for the passage of the air. As soon as the rear side of the belt running over the drying field is covered throughout its length with the strips of sods, the chain plates are tilted about the chains, into the position b shown in dotted lines in Fig. 1a, thereby depositing the sods from one to three sods deep upon the drying ground.

Figure 4 shows how the strips of sods 28 lie upon the drying ground.

In the interval of time in which the lowest strip of sods is raised and laid upon the belt conveyor, the cutting machine, running upon caterpillar tracks 20, and the associated depositor 21 running upon rollers and caterpillar tracks, are moved forward away from the working face of the bog through a distance equal to one sod breadth. At the same time the chains 32, with the abutment beam 10, are drawn up again to the uppermost position, by an abutment 39 on a chain wheel 26 pulling down, by means of levers 40 and 41, the said chains, which pass round the chain wheels 42. The machine is hereby brought into a position of readiness again for a fresh cut without special expenditure of time.

The advance of the machine away from the working face of the bog is effected by means of ratchet or feeding gear which is actuated by a shaft 25, driven by reducing spur gearing from the shaft 4b, and which can be adjusted according to the number of peat strips to be cut. This gear comprises a counter-shaft 22 fitted with a pawl mechanism 23, including a detent, operated by a connecting rod 24 and a crank from the shaft 25. The lever of the pawl mechanism on the one hand moves the caterpillar drive of the cutting machine by means of the counter-shaft 22 and the chain wheels 26 mounted fast thereon, and on the other hand, by means of rodding, moves a connecting rod along the depositor, by which, through the medium of running rollers 27, shown in Figure 2, the forward movement of the depositor (Figure 4) is obtained.

What I claim is:—

1. A machine for cutting, raising, conveying and depositing peat sods, comprising a cutting frame, a cutting blade at the lower edge of the cutting frame, the cutting frame being adapted to drop freely in making the cutting stroke, thereby causing the cutting blade to cut a strip of peat in a bog, dividing blades adapted to cut the strip of peat into sods, a pawl adapted to retain the cutting frame in its uppermost position, means for rocking the pawl to release the cutting frame, and an abutment beam adapted to bring the dividing blades into action when the cutting frame is approaching the end of its free fall.

2. A machine for cutting, raising, conveying and depositing peat sods, comprising a cutting frame, a long cutting blade secured in a substantially vertical plane along the lower edge of the cutting frame, the cutting frame, with the cutting blade, being adapted to fall freely in making the cutting stroke, dividing blades adapted to cut the strip of peat into sods, means for bringing the dividing blades into action when the cutting frame is approaching the end of its free fall, a pawl adapted to retain the cutting frame in its uppermost position, and means for rocking the pawl to release the cutting frame, the said rocking means comprising a rocking lever, an abutment on the rocking lever adapted to be brought into contact with the pawl, a connecting rod for actuating the rocking lever, a crank for actuating the connecting rod.

3. A machine for cutting, raising, conveying and depositing peat sods, comprising a cutting frame, a cutting blade at the lower edge of the cutting frame, the cutting frame being adapted to drop freely in making the cutting stroke, thereby causing the cutting blade to cut a strip of peat from the working face of a bog, a dividing frame hinged to the cutting frame, dividing blades on the dividing frame adapted to divide the strip of peat into sods, an adjustable abutment beam adapted to limit the free fall of the cutting frame according to the depth of the cut to be made, a locking bar adapted to retain the dividing frame in an upwardly rocked position during the early part of the free fall of the cutting frame, and a lever on the cutting frame adapted to strike against the abutment beam and thereby to withdraw the locking bar and release the dividing frame when the cutting frame is approaching the end of its free fall, so that the dividing blades will come into action almost simultaneously with the cutting blade.

4. A machine for cutting, raising, conveying and depositing peat sods, comprising a cutting frame, a cutting blade at the lower edge of the cutting frame, the cutting frame being adapted to drop freely in making the cutting stroke, thereby causing the cutting blade to cut a strip of peat from the working face of a bog, a dividing frame hinged to the cutting frame, dividing blades on the dividing frame adapted to divide the strip of peat into sods, a conveyor parallel to the lower edge of the cutting frame, lateral guides for positioning the cutting frame when raised and guiding it when falling, the guides being so supported as to be oscillatable about a horizontal axis from a position in which the cutting blade is ready for its cutting stroke and a position in which the cutting blade is immediately above the conveyor, and means for swinging the cutting frame guides from one of these positions to the other.

5. A machine for cutting, raising, conveying and depositing peat sods as claimed in claim 4, wherein the means for swinging the cutting frame guides comprise connecting rods pivoted to the said guides, cranks for actuating the connecting rods, a shaft to which the cranks are secured.

6. A machine for cutting, raising, conveying and depositing peat sods, comprising a cutting frame, a cutting blade at the lower edge of the cutting frame, the cutting frame being adapted to drop freely in making the cutting stroke, thereby causing the cutting blade to cut a strip of peat from the working face of a bog, a dividing frame hinged to the cutting frame, dividing blades on the dividing frame adapted to divide the strip of peat into sods, a conveyor parallel to the lower edge of the cutting frame, lateral guides for positioning the cutting frame when raised and guiding it when falling, the guides being so supported as to be oscillatable about a horizontal axis from a position in which the cutting blade is ready for its cutting stroke and a position in which the cutting blade is immediately above the conveyor, connecting rods pivoted to the said guides, cranks for actuating the connecting rods, a shaft to which the cranks are secured, and lever mechanism adapted to be actuated by the connecting rods and to rock the dividing frame into its upper position when the cutting frame is being swung from its cutting position into the position above the conveyor.

7. A machine for cutting, raising, conveying and depositing peat sods as claimed in claim 2, characterized by the feature that the rocking lever is adapted, when rocked in a direction opposite to that required for causing the pawl to release the cutting frame, to raise the cutting frame into its uppermost position in readiness for a fresh cutting stroke.

8. A machine for cutting, raising, conveying and depositing peat sods, comprising a cutting frame, a cutting blade at the lower edge of the cutting frame, the cutting frame being adapted to drop freely in making the cutting stroke, thereby causing the cutting blade to cut a strip of peat from the working face of a bog, a dividing frame hinged to the cutting frame, dividing blades on the dividing frame adapted to divide the strip of peat into sods, an adjustable abutment beam adapted to limit the free fall of the cutting frame according to the depth of the cut to be made, chains supporting the abutment beam, and means for raising the abutment beam to its uppermost position when the maximum depth has been reached.

9. A machine for cutting, raising, conveying and depositing peat sods as claimed in claim 8, wherein the means for raising the abutment beam comprise a wheel, ratchet mechanism for rotating the wheel, a stop on the wheel, and lever mechanism actuated by the stop and connected with the chains supporting the abutment beam.

10. A machine for cutting, raising, conveying and depositing peat sods, comprising a cutting frame, a cutting blade at the lower edge of the cutting frame, the cutting frame being adapted to drop freely in making the cutting stroke, thereby causing the cutting blade to cut a strip of peat from the working face of a bog, a dividing frame hinged to the cutting frame, dividing blades on the dividing frame adapted to divide the strip of peat into sods, a belt conveyor running parallel to the lower edge of the cutting frame, horizontal plates hinged to the belt conveyor and adapted to receive the cut sods from the blades and to convey them to a drying place.

11. A machine for cutting, raising, conveying and depositing peat sods as claimed in claim 10, characterized by the feature that the belt conveyor runs through the machine itself.

12. A machine for cutting, raising, conveying and depositing peat sods as claimed in claim 8, wherein the means for raising the abutment beam comprise a wheel, ratchet mechanism for rotating the wheel, a stop on the wheel, and lever mechanism actuated by the stop and connected with the chains supporting the abutment beam, and further means actuated by the said wheel for moving the machine away from the working face of the bog a distance equal to the breadth of one sod, simultaneously with the raising of the abutment beam.

HENDRIK HAVERKORT.